United States Patent [19]
Mimura et al.

[11] Patent Number: 5,283,566
[45] Date of Patent: Feb. 1, 1994

[54] PLANE DISPLAY

[75] Inventors: Akio Mimura, Katsuta; Kikuo Ono, Hitachi; Takashi Suzuki, Hitachi; Masao Yoshimura, Hitachi; Nobutake Konishi, Hitachiota; Jun-ichi Ohwada, Hitachi, all of Japan

[73] Assignee: Hitachi, Ltd., Japan

[21] Appl. No.: 869,085

[22] Filed: Apr. 15, 1992

Related U.S. Application Data

[63] Continuation of Ser. No. 333,177, Apr. 4, 1989, abandoned.

[30] Foreign Application Priority Data

Apr. 6, 1988 [JP] Japan .................................. 63-82955

[51] Int. Cl.⁵ .............................................. G09G 3/36
[52] U.S. Cl. ........................................ 345/211; 345/93
[58] Field of Search ............... 340/784, 719, 718, 811; 359/54, 55, 57, 58, 59, 87

[56] References Cited

U.S. PATENT DOCUMENTS 4,393,380  7/1983  Hosokawa et al. ................. 340/719
4,838,656  6/1990  Stoddard ............................ 350/336

FOREIGN PATENT DOCUMENTS 61-13228  1/1986  Japan .

OTHER PUBLICATIONS

Sid 84 Digest 1984, pp. 312–315.
"Alphanumeric and Video Performance of a 6"×6" 30 Lines-Per-Inch Thin-Film Transistor-Liquid Crystal Display Panel", Sid 78 Digest, pp. 94–95.

Primary Examiner—Ulysses Weldon
Assistant Examiner—Xiao M. Wu
Attorney, Agent, or Firm—Kenyon & Kenyon

[57] ABSTRACT

A plane display includes a plurality of pixel capacitors, each of which includes first and second electrodes and a non-linear optical material disposed therebetween. A plurality of storage capacitors are respectively provided in association with the plurality of pixel capacitors, each of which includes the first electrode of the corresponding pixel capacitor, an insulating film, and a third electrode insulated from the first electrode through the insulating film and connected to an external power supply terminal. Additionally, a provided for each storage capacitor and connected between the third electrode of the associated storage capacitor and the external power supply terminal, for preventing a potential drop causable in the course of storing electric charge in the associated storage capacitor.

18 Claims, 5 Drawing Sheets

PLANE DISPLAY

This application is a continuation of application Ser. No. 07/333,177, filed on Apr. 4, 1989, now abandoned.

BACKGROUND OF THE INVENTION

1. Field of the Invention

The present invention relates to a plane display and more particularly to a highly reliable liquid crystal display.

2. Description of the Related Art

A liquid crystal display features low power consumption and a small thickness of its body and is gaining widespread applications. An active matrix type liquid crystal display having pixels in the form of thin film transistors has good picture quality and is considered to be the leading configuration in this technical field. However, from the standpoint of reliability, this type of liquid crystal display suffers from degradation in picture quality. More particularly, electrical resistance of the liquid crystal changes overtime degrading in characteristics, and/or leakage current in switching transistors is increased with time, with the result that a predetermined level of voltage can not be maintained and hence transmitivity of the liquid crystal is changed. This causes a degraded picture quality such as degradation in contrast. To cope with this problem, a design has been proposed in which storage capacitors are provided in association with respective pixels. An example of this design is described in SID 84 DIGEST, 1984, pp. 312-315. Plan and sectional views of a specified construction of the storage capacitor are shown in JP-A-61-13228.

FIGS. 10 and 11 illustrate the fundamental construction of the prior art storage capacitor. Referring to these figures, a thin film transistor 2 provided in each pixel has a source 14 connected with a pixel transparent electrode 12, an insulating film 18 lies beneath the electrode 12, and a transparent electrode 13 of a storage capacitor lies beneath the insulating film 18 and extends to an end of a matrix substrate 1. At the matrix substrate end, the electrode 13 connects to a storage capacitor conductor 8 which extends to an external terminal. The pixel transparent electrode 12 and storage capacitor transparent electrode 13 may both be made of indium tin oxide (ITO). A signal voltage on a signal line 4 is transmitted from a drain 16 to the source 14 by applying a gate voltage to a gate 15 connected to a scanning line 3 to turn on the transistor 2. Then, the pixel transparent electrode 12 electrically connected to the source 14 drives liquid crystal to activate a capacitor across the liquid crystal and at the same time cooperates with the storage capacitor electrode 13 to form, across the insulating film, a storage capacitor of a capacitance which is a few times the value of the capacitance of the liquid crystal capacitor. The storage capacitor is effective to retain the voltage applied across the liquid crystal for a predetermined period of time.

The above construction was applied to relatively compact liquid crystal displays of 3-inch to 5-inch diagonal and its meritorious effects have been corroborated. On the contrary, large-sized liquid crystal displays face a new problem. More particularly, as the size of display increases to about 10 inches or more in diagonal, the storage capacitor electrode 13 connecting by itself to the conductor 8 exhibits an increased line resistance inside the display region and as a result a sufficient amount of charge can not be stored in the storage capacitor within the predetermined scanning time. This impairs the effects of the storage capacitor.

As is clear from the foregoing, the prior art display fails to consider a potential drop developing in the storage capacitor transparent electrode inside the display region of large-screen displays and it faced has the problem that it can not give full play to its storage capacitor effects.

SUMMARY OF THE INVENTION

The present invention solves the problem of the prior art display by preventing a potential drop in the storage capacitor electrode in large-sized liquid crystal displays.

According to the present invention, a potential drop preventive means, such as a low resistance wiring conductor, is provided in association with a storage capacitor transparent electrode inside the display pixel region.

In accordance with a preferred embodiment of the present invention, one of electrodes of the storage capacitor inside the display pixel region has the form of laminated layers made of materials having different conductivities.

The storage conductor or metal wiring conductor provided as the potential drop preventive means has a sufficiently low resistance to a prevent potential drop which would otherwise develop between the storage capacitor and the external terminal. Therefore, a predetermined amount of charge can be stored in the storage capacitor within the predetermined scanning time and degradation in picture quality can be prevented.

Particularly, the above beneficial effects are noticeable in large-sized plane displays.

DESCRIPTION

The present invention will now be described by way of example with reference to FIGS. 1 to 9 in the accompanying drawings.

Figure 1:
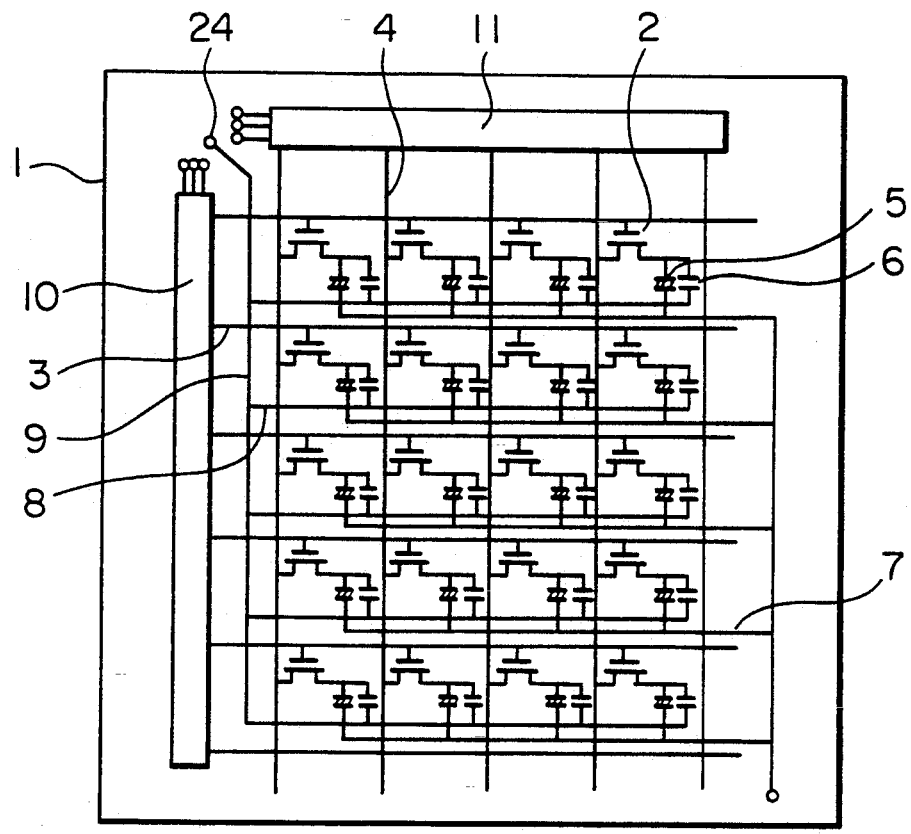
FIGS. 1 and 2 provide plan views of a matrix substrate for explaining the present invention, showing the positional relation and connection between respective components on the matrix substrate.
Figure 3:
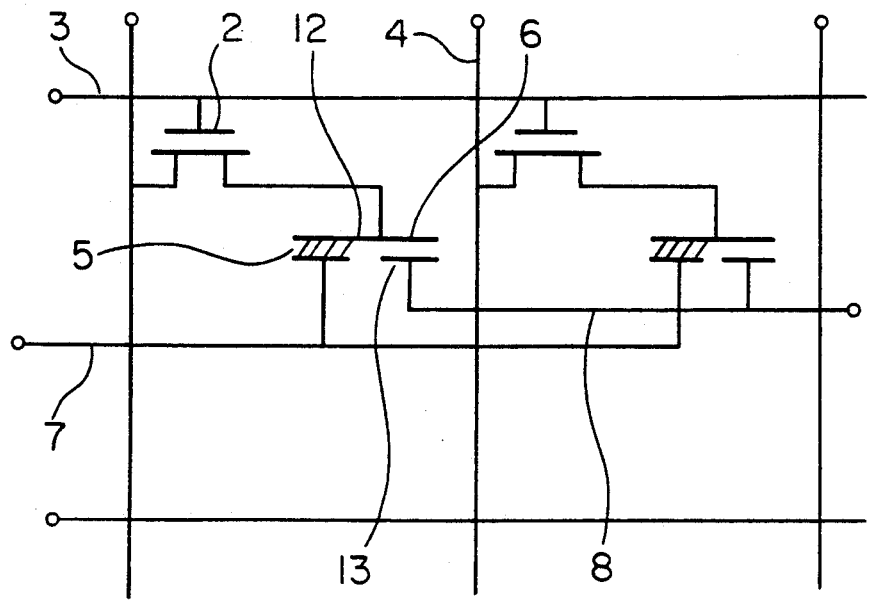
FIG. 3 is a circuit diagram showing how pixels of the matrix are connected in accordance with the present invention.

FIG. 1 schematically illustrates the construction of a matrix substrate 1 having storage capacitors, and FIG. 3 conceptionally illustrates, in enlarged form, a pixel portion. Pixels are arranged in matrix of rows and columns and each pixel includes a thin film transistor 2 connected to a scanning line 3 and a signal line 4. Each pixel has a transparent pixel electrode 12 and an opposing electrode 7 to form a liquid crystal cell 5 therebetween and it also has a transparent electrode 13 for storage capacitor which cooperates with the pixel electrode 12 to form a storage capacitor 6. The storage capacitor transparent electrode 13 is connected, through a storage capacitor conductor 8 unique to the present invention, to a storage capacitor external conductor 9 connected to an external terminal 24. The external conductor 9 connects to an external control circuit (not shown) through the external terminal 24, and the storage capacitor electrode 13 and opposing electrode 7 are maintained at the same fixed potential. A scanning circuit 10 and a signal circuit 11 are built on the substrate in FIG. 1.

Figure 2:
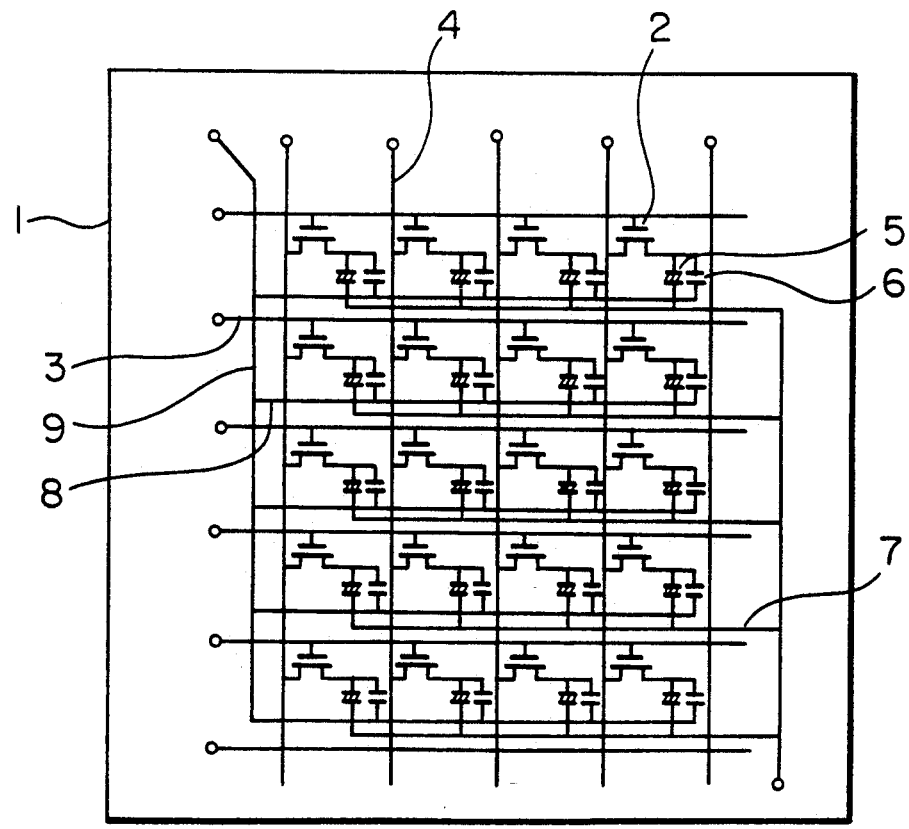

A matrix substrate as shown in FIG. 2 is identical to the FIG. 1 substrate with the only exception being that the FIG. 2 substrate does not incorporate scanning and signal circuits.

Figure 4:
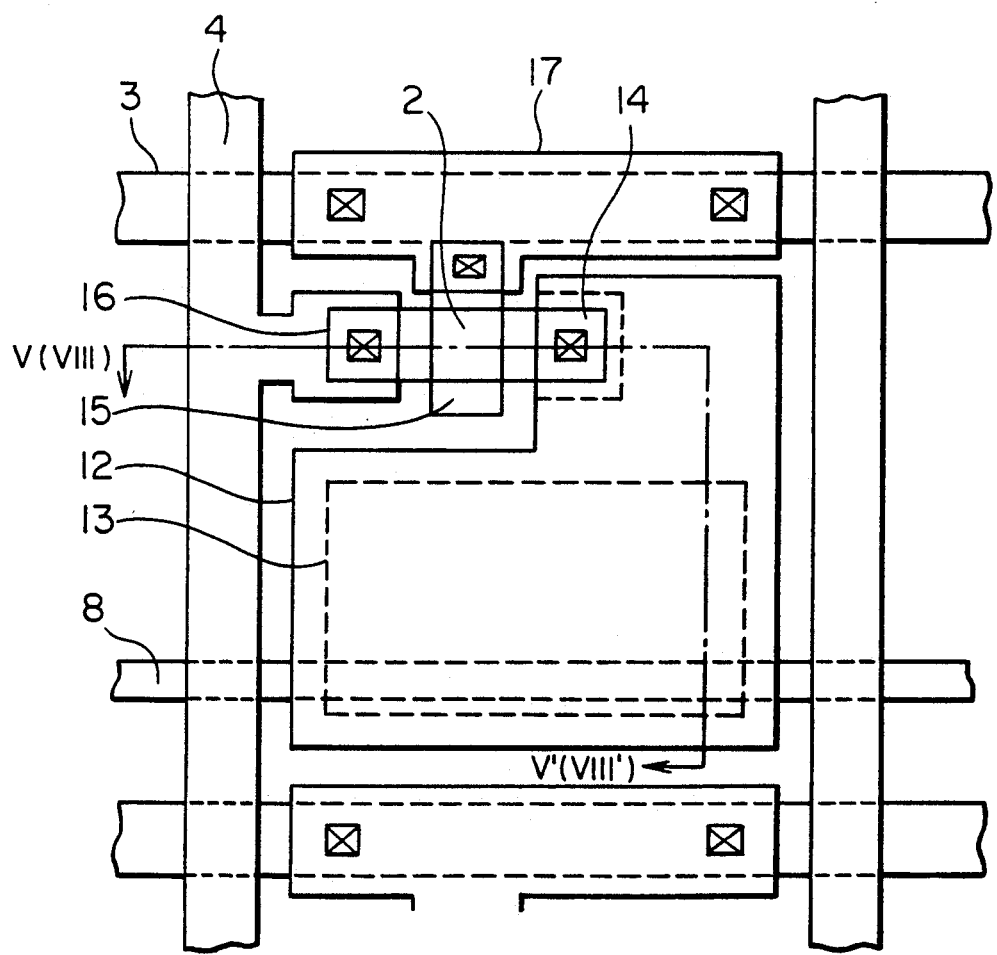
FIG. 4 is a plan view of a pixel portion according to a first embodiment of the present invention.

FIG. 4 is a plan view illustrating a specified construction of the pixel portion. In FIG. 4, elements like those in FIGS. 1 to 3 are designated by like reference numerals. The thin film transistor 2 has a source 14, a gate 15 and a drain 16. Disposed below the pixel transparent electrode 12 are the storage capacitor transparent electrode 13 and the storage capacitor conductor 8 extending in parallel with the scanning line 3. The effective area of the pixel transparent electrode 12 excludes a portion overlapping other opaque layers such as the source 14 of thin film transistor 2.

Figure 5:
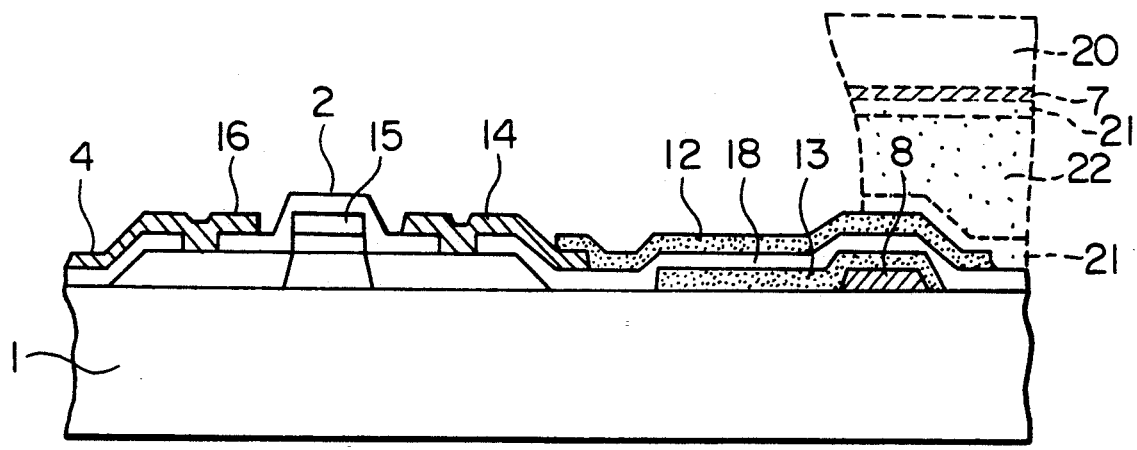
FIG. 5 is a sectional view taken on the line V—V' of FIG. 4.

FIG. 5 is a schematic sectional view taken on the line V—V' of FIG. 4. The storage capacitor includes storage capacitor conductor 8, storage capacitor transparent electrode 13, insulating film 18 and pixel transparent electrode 12. The storage capacitor electrode 8 is formed simultaneously with the formation of the scanning line 3 and by using the same material, for example, aluminum. The scanning line 3 is doubled, at its portion between the intersections with the signal line 4, with an overlying conductor layer 17 which is formed simultaneously with formation of the scanning line 4. As partially shown in FIG. 5, an opposing substrate 20 is provided and it supports on its one surface the opposing electrode 7 which faces the transparent electrode 12 so that a non-linear optical material 22 such as liquid crystal or electroluminescence material may be filled in a space between the electrodes 7 and 12. The plan view is depicted with omission of the opposing electrode 7, opposing substrate 20 and liquid crystal 22. Further, in a liquid crystal cell, there are provided a pair of orienting layers 21.

Referring to FIGS. 1 to 5, a signal voltage applied to the signal line 4 is transmitted to the source 14 through the drain 16 and gate 15 of thin film transistor 2 and then supplied to the pixel transparent electrode 12. Consequently, the liquid crystal cell between the electrode 12 and opposing electrode 7 is activated and at the same time, a storage capacitor between the storage capacitor transparent electrode 13 and electrode 12, having a capacitance which is a few times that of the value of the capacitance of the liquid crystal cell, is activated. At that time, electric charge is stored into the storage capacitor at high speeds through the storage capacitor conductor 8 of low resistance. Accordingly, under scanning of the individual pixel capacitors in a predetermined time relationship, sufficient writing (charging) can be effected within a predetermined interval of time dedicated to scanning of each pixel. If the storage capacitor conductor 8 is made of opaque metal, it intercepts light. However, the conductor 8 can be made to be thin or slender without imparing its requisite low resistance and does not have the substantial influence upon the operation of the display.

Figure 6:
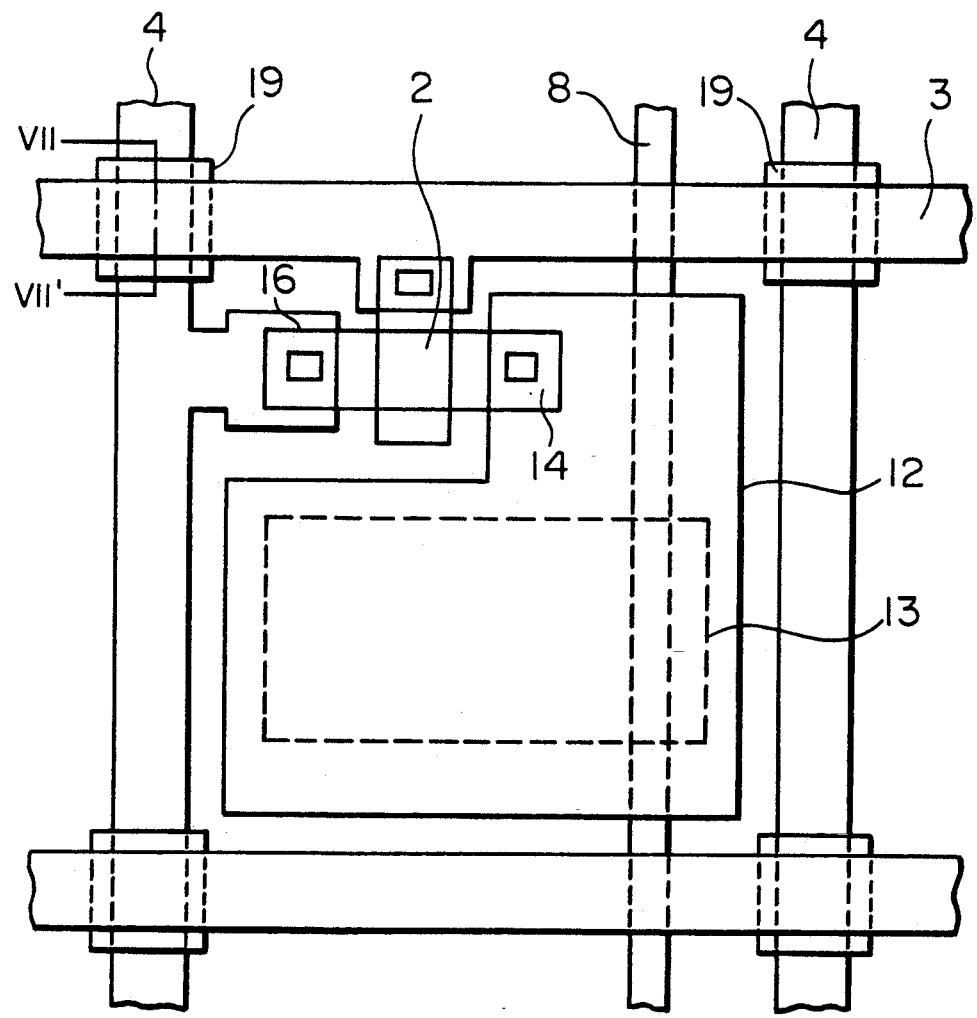
FIG. 6 is a plan view of a pixel portion according to a second embodiment of the present invention.
Figure 7:
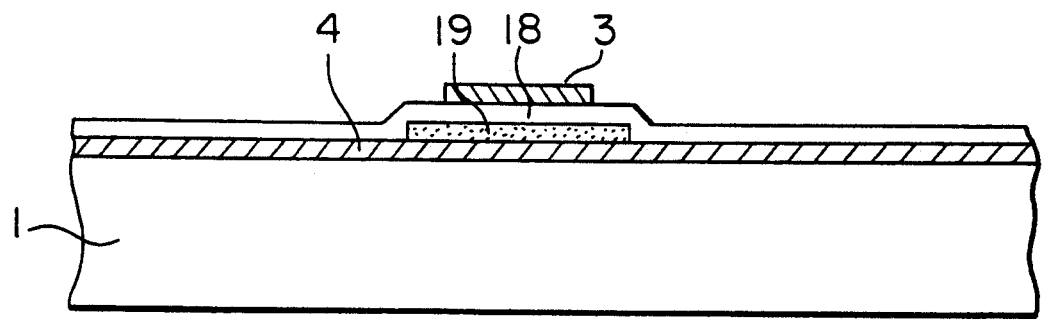
FIG. 7 is a sectional view taken on the line VII—VII' of FIG. 6.

FIG. 6 illustrates a second embodiment of the pixel portion, and FIG. 7 is a sectional view taken on the line VII—VII' of FIG. 6. In the pixel of this embodiment, the wiring is of a two-layer structure with a signal line 4 corresponding to the lower layer and a scanning line 3 corresponding to the upper layer. A storage capacitor conductor 8 is coplanar with the signal line 4 and extends in parallel therewith. The signal line 4 and conductor 8 are formed simultaneously. In accordance with this embodiment, an underlying wiring protective film 19 in the form of a transparent electrode is particularly provided at the crossing portion of scanning line 3 and signal line 4. The underlying wiring protective film 19 is formed on the signal line 4 through the same process as that for the storage capacitor transparent electrode 13. The underlying wiring protective film 19 is of a stable film made of ITO (indium tin oxide $In_2O_3 \cdot SnO_2$) and the underlying wiring standing for the signal line 4 is made of, for example, crystallized aluminum effective to prevent hillock, thereby promoting reliability (ability to prevent short circuit) of the two-layer wiring. By forming an underlying wiring protective film 19 over the entire surface of the signal line 4, a full double wiring structure can be realized which is effective to prevent troubles of disconnection.

Figure 8:
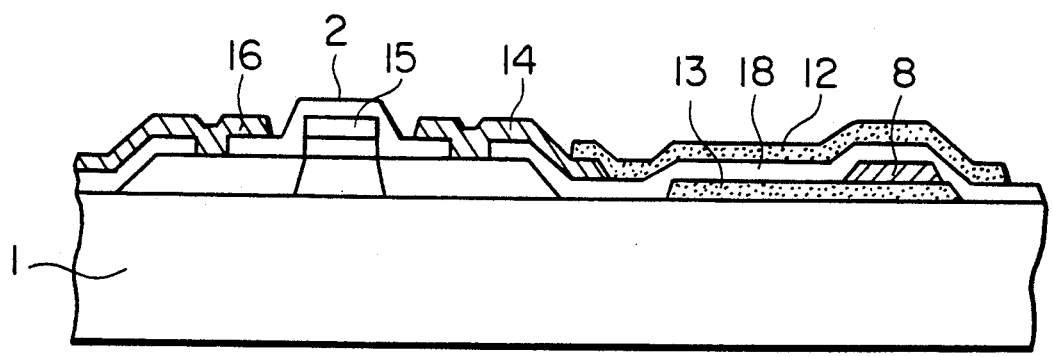
FIG. 8 is a sectional view, taken along the line (VIII-)—(VIII') of FIG. 4, showing a third embodiment of the pixel portion of the present invention having the same plan configuration as the first embodiment.

FIG. 8 is a sectional view illustrative of a third embodiment of the pixel portion. The plan view of this embodiment is the same as FIG. 4 but when FIG. 4 is sectioned on the line VIII—VIII', the sectional view of FIG. 8 that results is different from the sectional view of FIG. 5. This embodiment features that a storage capacitor conductor 8 is formed on a storage capacitor transparent electrode 13. In the embodiment of FIG. 5, the storage capacitor transparent electrode of ITO layer is disposed on an Al layer and hence it is possible that an exposed part of the Al layer is subjected to corrosion when patterning the ITO layer. In the embodiment of FIG. 8, the patterning and heat treatment can be applied to only the storage capacitor transparent electrode of ITO layer thereby preventing the Al layer from being affected by the patterning process of the ITO layer. Thus, the range of application can be widened by the flexibility of the fabrication process.

Figure 9:
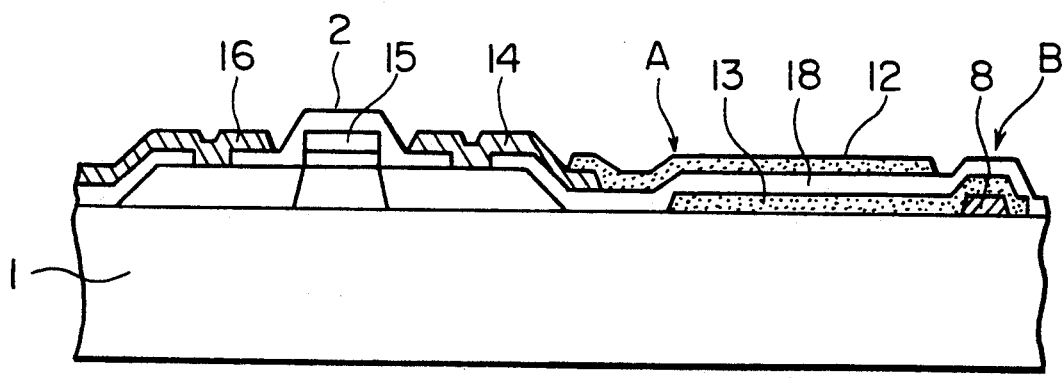
FIG. 9 is a sectional view showing a further embodiment of the pixel portion of the present invention.
Figure 10:
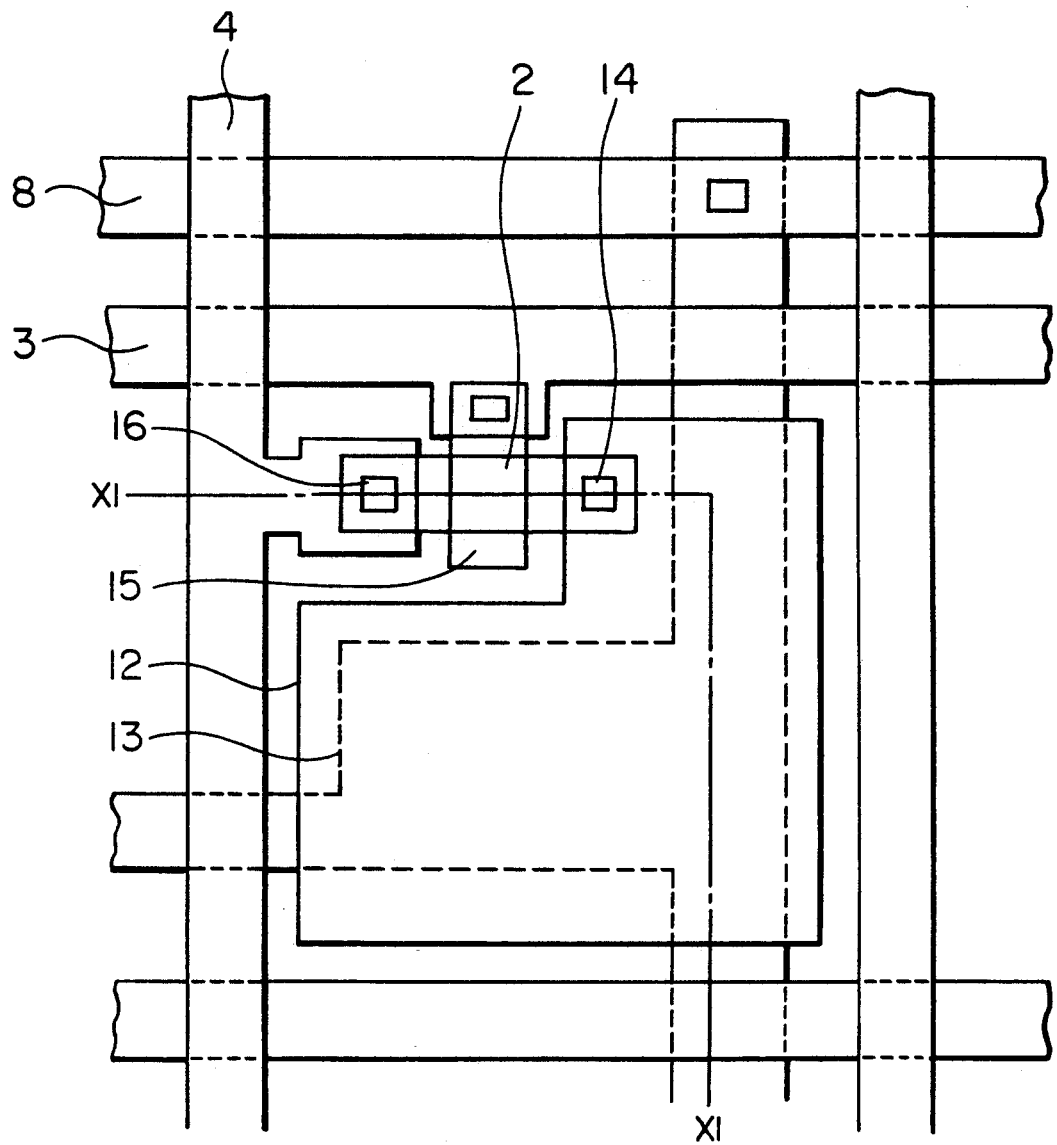
FIG. 10 is a plan view showing a pixel portion of a prior art display.
Figure 11:
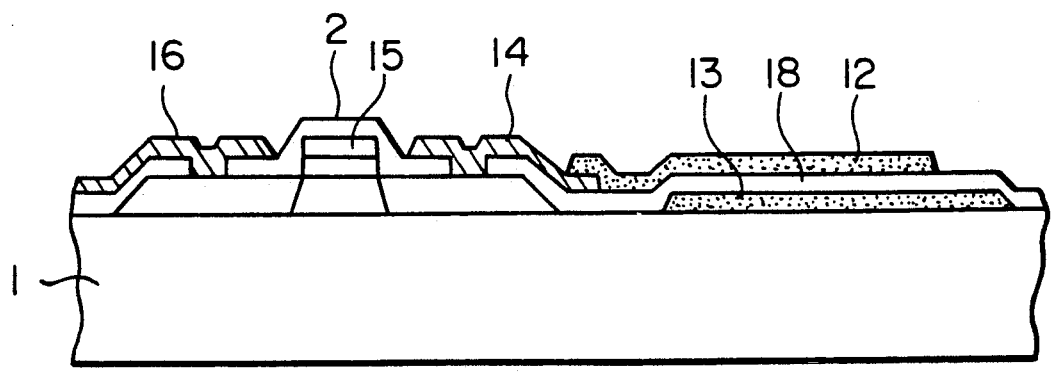
FIG. 11 is a sectional view taken on the line XI—XI' of FIG. 10.

FIG. 9 shows a further embodiment. In this embodiment, a storage capacitor transparent electrode 13 extends externally of the transparent electrode 12 to form an extension and a storage capacitor conductor 8 is formed beneath the extension of the storage capacitor transparent electrode 13. Generally, covering by the insulating film 18 is poor at stepped portions or shoulders of the storage capacitor transparent electrode 13 which are formed at side edges B of the storage capacitor conductor 8 and dielectric strength may potentially be decreased at the stepped portions. Advantageously, in accordance with the FIG. 9 embodiment, no storage capacitor is created at the stepped portions and besides the pixel transparent electrode 12 need not pass over the sharp shoulders before reaching the source 14, promoting the prevention of a short circuit between the pixel transparent electrode 12 and storage capacitor transparent electrode 13. The pixel transparent electrode 12 in effect passes over a stepped portion A, but thanks to a small thickness of about 1000 Å of the storage capacitor electrode 13, evenness of the insulating film 18 can not be disturbed at the stepped portion A and short circuit between the electrodes 12 and 13 will not be invited.

The thin film transistor used in the foregoing embodiments may be made of any compound semiconductor material such as, for example, single crystalline silicon and, non-single crystalline silicon. The transparent electrode described as being made of ITO may alternatively be a thin metal film such as made of gold or a thin semiconductor film such as made of silicon. In place of the $SiO_2$ insulating film, an insulating film of SiN, $Ta_2O_5$ or $Al_2O_3$ may be used. Further, as the material for the storage capacitor conductor, there may be available, in addition to aluminum, such metal as tungsten and molybdenum, such silicide as molybdenum silicide and platinum silicide, a low-resistance semiconductor layer and a superconductor layer.

The display has been described as being a liquid crystal display but teachings of the invention may be applied to other types of display such as an electroluminescence display in a similar manner.

Preferably, the transparent electrode, storage capacitor transparent electrode and storage capacitor conductor used in the foregoing embodiments may be prepared through a sputtering process from the standpoint of film quality but they may also be prepared through a CVD process or vapor deposition process.

When in the foregoing embodiments the pixel transparent electrode and upper-layer wiring are being formed, the storage capacitor conductor may be maintained at a fixed potential so as to serve as a discharge means which is effective to prevent electrostatic breakdown.

Although in the foregoing embodiments the storage capacitor electrodes of adjacent pixels are interconnected with each other by only the storage capacitor conductor, the storage capacitor conductor and storage capacitor electrode may be formed by a double-wiring structure which is used outside the display region for interconnection of adjacent pixels.

Various alterations or modifications of the invention set forth so far may be conceived including, for example, a plane display in which at at least a crossing portion of two-layer wiring of the scanning and signal lines and of two-layer wiring of circuit connection lines, the same member as the storage capacitor transparent electrode is disposed on the lower-layer conductor; a plane display in which at the same crossing portion as above, the same member as the pixel transparent electrode is disposed on the upper-layer conductor; a plane display in which the storage capacitor conductor is the same as the lower one of the scanning and signal lines; a plane display which incorporates a peripheral drive circuit and in which the storage capacitor conductor electrically connected to the matrix region is disposed between the matrix region and peripheral circuit region; a plane display in which the main portion of a pixel electrode is formed inside the stepped portion created by the storage capacitor transparent electrode and storage capacitor conductor; and a video signal display system, projection type video signal display system or numerical/alphabetical/graphic processing system using any one of the above types of plane displays.

As described above, according to the present invention, sufficient writing (charging) to the storage capacitor can be insured and therefore picture quality of the liquid crystal display and reliability of display can be improved.

What is claimed is:

1. A plane display comprising:
   a plurality of pixel capacitors disposed in rows and columns within a display region of said plane display, each pixel capacitor including first and second electrodes and a non-linear optical material disposed therebetween, the first electrode of each pixel capacitor having a transparent part;
   a plurality of thin film transistors connected to said first electrodes of said plurality of pixel capacitors, respectively, for selectively energizing said pixel capacitors;
   a plurality of storage capacitors disposed in rows and columns within the display region and respectively provided in association with said plurality of pixel capacitors and each including a third electrode having a transparent part facing to the transparent part of the first electrode of the associated pixel capacitor with an insulating film therebetween so as to provide a storage capacitance in cooperation with the transparent part of said first electrode facing thereto; and
   means for applying a given electrical potential to each of the third electrodes of said plurality of storage capacitors and including an auxiliary conductive layer through display portions of selected pixels within the display region and made of a metallic material which is electrically connected and physically in direct connection with the transparent parts of the third electrodes of the storage capacitors associated with the pixel capacitors of said selected pixels.

2. A plane display according to claim 1 wherein the effective area of said first electrode excludes a laminated portion of said third electrode of the associated storage capacitor and said auxiliary conductive layer.

3. A plane display according to claim 1 wherein said auxiliary conductive layer is disposed on one side of each of the parts of the third electrodes with which said conductive layer is connected, said one side being opposite to a side of the part facing to said first electrode.

4. A plane display according to claim 3 wherein the effective area of said first electrode excludes a laminated portion of said third electrode of the associated storage capacitor and said auxiliary conductive layer.

5. A plane display according to claim 1 wherein said plurality of pixel capacitors disposed in the rows are sequentially scanned row by row in a predetermined time relationship through scanning lines respectively associated with said rows, said auxiliary conductive layer associated with each row is disposed substantially parallel to said scanning line associated with the row.

6. A plane display according to claim 5 wherein the effective area of said first electrode excludes a laminated portion of said third electrode of the associated storage capacitor and said auxiliary conductive layer.

7. A plane display according to claim 1 wherein said first and third electrodes are made of a material containing indium oxide as main constituent, and said auxiliary conductive layer is made of a material containing aluminum as main constituent.

8. A plane display according to claim 1, further comprising a substrate on which each of said pixel capacitors, the thin film transistor connected to the first electrode of the pixel capacitor, the storage capacitor associated with the pixel capacitor and the auxiliary conductive layer in direct connection with the transparent part of the third electrode of the storage capacitor are formed and said auxiliary conductive layer being disposed between said substrate and the transparent part of the third electrode of said storage capacitor.

9. A plane display comprising:
a plurality of pixel capacitors disposed in rows and columns within a display region of said plane display to be scanned in a predetermined time relationship;
a plurality of storage capacitors disposed in rows and columns within the display region and respectively provided in association with said pixel capacitors, each storage capacitor having a transparent electrode which is facing to a transparent part of one of the electrodes forming the associated pixel capacitor so as to provide a storage capacitance therebetween inside a region of the corresponding pixel capacitor; and
wiring means including a plurality of auxiliary conductive layers, each extending through display portions of selected pixels within the display region and arranged to be laminous with the transparent electrode of each of the storage capacitors associated with said selected pixels and made of a metallic material for permitting each storage capacitor to be written within an interval of time which is not longer than the scanning time for each pixel capacitor.

10. A plane display according to claim 9 wherein said plurality of pixel capacitors are arranged in rows and columns, the pixel capacitors lined up in each row are connected in common to a scanning line, the pixel capacitors lined up in each column are connected in common to a signal line, and at least one of said scanning and signal lines is made of the same material as that of said conductive layer.

11. A plane display according to claim 9 wherein one of the electrodes of each storage capacitor has one portion made of the same conductive material as that of one of electrodes of said pixel capacitor and another portion made of a conductive material different from that of said one electrode of said pixel capacitor.

12. A plane display according to claim 9 wherein said plurality of pixel capacitors are arranged in matrix.

13. A plane display according to claim 9, further comprising a substrate on which each of said pixel capacitors, the storage capacitor associated with the pixel capacitor and the auxiliary conductive layer which is laminous with the transparent electrode of the storage capacitor are formed and said auxiliary conductive layer being disposed between said substrate and the transparent part of the third electrode of said storage capacitor.

14. A video signal display system having a plane display comprising:
a plurality of pixel capacitors disposed in rows and columns within a display region of said plane display, each pixel capacitor including first and second electrodes and a non-linear optical material disposed therebetween, the first electrode of each pixel capacitor having a transparent part;
a plurality of thin film transistors connected to said first electrodes of said plurality of pixel capacitors, respectively, for selectively energizing said pixel capacitors;
a plurality of storage capacitors disposed in rows and columns within the display region and respectively provided in association with said plurality of pixel capacitors and each including a third electrode having a transparent part facing to the transparent part of the first electrode of the associated pixel capacitor with an insulating film therebetween so as to provide a storage capacitance in cooperation with the transparent part of said first electrode facing thereto; and
means for applying a given electrical potential to each of the third electrodes of said plurality of storage capacitors and including an auxiliary conductive layer extending through the display portions of selected pixels within the display region and made of a metallic material which is electrically connected and physically in direct connection with the transparent parts of the third electrodes of the storage capacitors associated with the pixel capacitors of said selected pixels.

15. A video signal display system according to claim 14, further comprising;
a substrate on which each of the pixel capacitors, the thin film transistor connected to the first electrode of the pixel capacitor, the storage capacitor associated with the pixel capacitor and the auxiliary conductive layer in direct connection with the transparent part of the third electrode of the storage capacitor are formed and said auxiliary conductive layer being disposed between said substrate and the transparent part of the third electrode of said storage capacitor.

16. A projection type video signal system having a plane display comprising:
a plurality of pixel capacitors disposed in rows and columns within a display region of said plane display, each pixel capacitor including first and second electrodes and a non-linear optical material disposed therebetween, the first electrode of each pixel capacitor having a transparent part;
a plurality of thin film transistors connected to said first electrodes of said plurality of pixel capacitors, respectively, for selectively energizing said pixel capacitors;
a plurality of storage capacitors disposed in rows and columns within the display region and respectively provided in association with said plurality of pixel capacitors and each including a third electrode having a transparent part facing to the transparent part of the first electrode of the associated pixel capacitor with an insulating film therebetween so as to provide a storage capacitance in cooperation with the transparent part of said first electrode facing thereto; and
means for applying a given electrical potential to each of the third electrodes of said plurality of storage capacitors and including an auxiliary conductive layer extending through display portions of selected pixels within the display region and made of a metallic material which is electrically connected and physically in direct connection with the transparent parts of the third electrodes of the storage capacitors associated with the pixel capacitors of said selected pixels.

17. A projection type video signal system according to claim 16, further comprising;
a substrate on which each of said pixel capacitors, the thin film transistor connected to the first electrode of the pixel capacitor, the storage capacitor associated with the pixel capacitor and the auxiliary conductive layer in direct connection with the transparent part of the third electrode of the storage capacitor are formed such that said auxiliary conductive layer being disposed between the transparent part of third electrode of said storage capacitor and said substrate.

18. A method of making a plane display comprising a plurality of pixel capacitors disposed within a display region, each pixel capacitor having two pixel electrodes and a plurality of storage capacitors provided to said pixel capacitors, respectively, each of said storage capacitors having two auxiliary electrodes, one of which is connected to one of said pixel electrodes, the other auxiliary electrode being connected to an auxiliary conductor to be connected to a predetermined potential, said method comprising the steps of:

forming a first layer of metallic material to extend within said display region through display portions of selected pixel capacitors, said first layer serving as the auxiliary conductor to which the other auxiliary electrodes of the storage capacitors provided to the selected pixel capacitors are to be connected; and laminating on said first layer a transparent layer of a second conductive material and forming a third layer so as to provide a capacitance in cooperation with said second transparent layer, while connecting said first layer to a fixed potential, said second layer serving as the other auxiliary electrode and said capacitance provided by said second and third layers serving as the storage capacitor.

* * * * *

UNITED STATES PATENT AND TRADEMARK OFFICE
CERTIFICATE OF CORRECTION

PATENT NO. : 5,283,566
DATED : February 1, 1994
INVENTOR(S) : Akio Mimura et al

It is certified that error appears in the above-indentified patent and that said Letters Patent is hereby corrected as shown below:

Column 1, line 22, change "overtime" to --over time,--.
Column 2, line 7, delete "faced".
Column 2, line 62, Before "DESCRIPTION" insert --DETAILED--.
Column 4, line 25, Change "$In_2O_3.SnO_2)$" to --$In_2O_3 \cdot SnO_2)$--.

Signed and Sealed this

Second Day of August, 1994

Attest:

BRUCE LEHMAN

*Attesting Officer*   *Commissioner of Patents and Trademarks*